(12) United States Patent
Hong

(10) Patent No.: US 7,355,661 B2
(45) Date of Patent: Apr. 8, 2008

(54) LIQUID CRYSTAL DISPLAY MODULE

(75) Inventor: Hyung Ki Hong, Seoul (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 8 days.

(21) Appl. No.: 10/750,575

(22) Filed: Dec. 29, 2003

(65) Prior Publication Data

US 2005/0105014 A1 May 19, 2005

(30) Foreign Application Priority Data

Mar. 13, 2003 (KR) .................. 10-2003-0015679

(51) Int. Cl.
*G02F 1/1335* (2006.01)
(52) U.S. Cl. ............... 349/65; 349/62; 349/63; 349/64; 349/158
(58) Field of Classification Search ........ 349/113–114, 349/61, 62–65, 158
See application file for complete search history.

(56) References Cited

U.S. PATENT DOCUMENTS

| | | | | |
|---|---|---|---|---|
| 5,341,231 A | * | 8/1994 | Yamamoto et al. ........... 349/63 |
| 6,642,976 B2 | * | 11/2003 | Umemoto et al. ............ 349/65 |
| 6,950,155 B2 | * | 9/2005 | Umemoto ..................... 349/61 |
| 7,030,945 B2 | * | 4/2006 | Umemoto et al. ............ 349/65 |
| 2002/0154256 A1 | * | 10/2002 | Gotoh et al. .................. 349/65 |
| 2003/0043315 A1 | * | 3/2003 | Umemoto et al. ............ 349/65 |
| 2003/0218701 A1 | * | 11/2003 | Kawakami .................... 349/65 |
| 2004/0100598 A1 | * | 5/2004 | Adachi et al. ............... 349/113 |

FOREIGN PATENT DOCUMENTS

KR  1999-63956  4/1997

OTHER PUBLICATIONS

Office Action for Korean Patent Application No. 10-2003-0015679 dated Dec. 20, 2004.

* cited by examiner

*Primary Examiner*—David Nelms
*Assistant Examiner*—(Nancy) Thanh-Nhan P Nguyen
(74) *Attorney, Agent, or Firm*—Brinks Hofer Gilson & Lione

(57) ABSTRACT

A liquid crystal display module includes a light source that generates light. A light guide panel has a first refractive index. Light from the light source propagates through the light guide panel. A low refractive index layer is disposed on the light guide panel and has a second refractive index which is lower than that of the light guide panel. A transmissive liquid crystal display panel is disposed on the upper part of the lower refractive layer.

10 Claims, 7 Drawing Sheets

LIQUID CRYSTAL DISPLAY MODULE

This application claims the benefit of Korean Patent Application No. P2003-15679 filed on Mar. 13, 2003, which is hereby incorporated by reference.

BACKGROUND OF THE INVENTION

1. Field of the Invention

The present invention relates to a liquid crystal display module, and more particularly to a liquid crystal display module that can be made lightweight with reduced light loss.

2. Description of the Related Art

Generally, a liquid crystal display (hereinafter, referred to as LCD) displays a desired picture on a screen by controlling the transmittance of the light supplied from a backlight unit by using a liquid crystal display panel including a plurality of liquid crystal cells arranged in a matrix and a plurality of control switches to switch video signals to be supplied to each of the liquid crystal cells.

FIG. 1 is a perspective view representing a known liquid crystal display module.

Referring to FIG. 1, the liquid crystal display module includes a lamp 22 to generate light, a lamp housing 4 where the lamp 22 is equipped, a light guide panel 2 to convert an incident light from the lamp 22 into a surface light, optical sheets 8, 10, 12 and 14 stuck to the light guide panel 2 to increase the efficiency of the light incident to a display panel, a reflective plate 6 stuck to the rear surface of the light guide panel 2 to reflect the light emitted through the rear surface of the light guide panel 2, and a liquid crystal display panel 20 to realize a picture in use of the light generated at the lamp 22.

The lamp 22 is mainly a cold cathode fluorescent lamp. And the light generated at the lamp 22 is incident to the light guide panel 2 through the incident surface that exists at the side of the light guide panel 2.

The lamp housing 4 is installed to have a reflective surface in the inner surface thereof in a manner of covering the lamp 22, so as to reflect the light from the lamp 22 to the incidence surface of the liquid guide panel 2.

The light guide panel 2 converts the incident light from the lamp 22 into the surface light. Such a light guide panel 2 has a sloped lower surface and a horizontal upper surface, which are perpendicular to each other. The lower surface of the light guide panel 2 has a reflective plate 6. The light guide panel 2 transmits the incident light from the lamp 22 towards the end opposing the end to which the lamp 22 is attached. The light guide panel 2 is made of polymethyl methacrylate (PMMA), which has a good transmissivity and has high degree of strength, so that it is not easily changed or broken.

The light incident on the reflective plate 6 is reflected through the rear surface of the light guide panel 2 to the light guide panel 2, thereby reducing light loss.

If the light from the lamp 22 is incident to the light guide panel 2, it is reflected at the lower surface, which is sloped at a specific tilt angle so the light progresses evenly toward the outgoing surface. The light, which progresses to the lower surface and the side surface of the light guide panel 2, is reflected to the reflective plate 6 to progress toward the outgoing surface. The light emitted through the outgoing surface of the light guide panel 2 is diffused to the whole area by the diffusion sheet 8. On the other hand, the light incident to the liquid crystal display panel 20 has the highest light efficiency when it is perpendicular. For this, two prism sheets 10 and 12 are stacked in order to make the progress angle of the light emitted from the light guide panel 2, and the light is perpendicular to the liquid crystal display panel 2.

First and second prism sheets 10 and 12 are composed of a plurality of prism arrays with peaks and valleys. The two prism sheets 10, 12 concentrate the outgoing light from the diffusion sheet 8 in a direction perpendicular to the lower planar surface.

A protective film 14 is used to protect the surface of the second prism sheet 12, and diffuse the light to evenly distribute the light.

In this way, the light generated at the backlight unit is incident to the liquid crystal display panel 20.

The liquid crystal display panel 20 is formed between an upper polarizer 18 and a lower polarizer 16. It has liquid crystal cells arranged between upper and lower substrates 20A, 20B in an active matrix. And the liquid crystal display panel 20 has a thin film transistor installed at each of the liquid crystal cells to switch video signals. The refractive index of each liquid crystal cell is changed in accordance with the video signal, so a picture corresponding to the video signal is displayed. That is, the liquid crystal panel 20 displays a picture by selectively transmitting the light from the backlight unit by way of having liquid crystal driven by a voltage difference between a common electrode of the upper substrate 20A and the a pixel electrode of the lower substrate 20B.

The first and second prism sheets 10 and 12 and a diffusion sheet 8 among the optical sheets of the liquid crystal display module include a function layer where the optical sheet is actually functional (i.e. provides the functional features), and a support layer which supports the function layer. For the diffusion sheet 8, a function layer of several tens μm and below which is a dispersion layer is located on a support layer of 100~220 μm. For the first and second prism sheet 10 and 12, a prism pattern which is a function layer of several tens μm is located on a support layer of up to 100 μm. There is a problem in that the overall thickness of the liquid crystal display module gets thicker due to the supporting layer. In order to solve such a problem, in the known liquid crystal display module, lightness and high brightness have been studied, especially the lightness of backlight unit has been actively studied.

For example, a liquid crystal display module has been suggested in which the light guide panel and the optical sheets are integrated as shown in FIG. 2, and a liquid crystal display module where the light guide panel and the optical sheets are removed as shown in FIG. 3.

The liquid crystal display module shown in FIG. 2 forms optical sheets 30 on the light guide panel 2, thereby reducing the thickness of the backlight unit since it is not necessary to form a support layer for the optical sheets 30. However, there is a problem in that light loss occurs when the outgoing light from the light guide panel 2 repeatedly passes through the optical sheets 30 and the polarizer 16 as shown in FIG. 2. This is because a total reflection condition established by a gap between the light guide panel 2 and the optical sheets 30 can not be established between the light guide panel 2 and the other optical sheets 30 stuck thereto.

The liquid crystal display module shown in FIG. 3 may reduce the thickness of the backlight unit by constituting a light guide panel with the lower substrate of the liquid crystal display panel without any separate light guide panel. However, in case that the light is incident from the lamp 22 that is located at one side of the lower substrate 20B, there is a problem in that light loss occurs when the light generated at the lamp 22 repeatedly passes through the optical sheets 26, the polarizer 16, lower patterns (thin film transistor, signal line and pixel electrode) formed on the polarizer 16 and upper patterns (common electrode, color filter and black matrix) formed on the upper substrate 20A.

SUMMARY OF THE INVENTION

Accordingly, embodiments of the present invention provide a liquid crystal display module that can be made lightweight with reduced light loss.

In order to achieve these and other advantages of the invention, a liquid crystal display module according to an aspect of the present invention includes a light source to generate light and a light guide panel through which the light from the light source propagates. The light guide panel has a first refractive index. A low refractive index layer is disposed on the light guide panel and has a second refractive index which is lower than the first refractive index. A transmissive liquid crystal display panel is disposed on an upper portion of the lower refractive layer.

The light in the light guide panel may be totally reflected at a border between the light guide panel and the low refractive index layer when the light in the light guide panel impinges on the border at an angle of: $90°-\sin^{-1}(1/\text{the first refractive index})>\sin^{-1}(\text{the second refractive index/the first refractive index})$.

The first and second refractive indices may be 1.7 and 1.35, respectively.

The liquid crystal display module may further comprise optical sheets disposed on the low refractive index layer and a polarizer disposed on the optical sheets to polarize light from the optical sheets.

The liquid crystal display panel may include a lower substrate disposed on the polarizer and an upper substrate facing the lower substrate with liquid crystal therebetween to selectively transmit the light through the liquid crystal by driving the liquid crystal or an upper substrate facing the polarizer with liquid crystal therebetween to selectively transmit the light through the liquid crystal by driving the liquid crystal and no substrate disposed between the liquid crystal and the light guide panel.

The liquid crystal display module may further comprise a condenser disposed between the light source and the light guide panel.

The light in the light guide panel then may be totally reflected at a border between the light guide panel and the low refractive index layer when the light in the light guide panel impinges on the border at an angle of: $90°-\text{condensed degree by the condenser}>\sin^{-1}(\text{the second refractive index/the first refractive index})$.

The first and second refractive indices may be 1.5 and 1.35, respectively.

The low refractive index layer may be disposed on a first surface of the light guide panel and a second surface of the light guide panel that opposes the first surface may have a plurality of grooves to reflect light impinging on the grooves towards the transmissive liquid crystal display panel.

The liquid crystal display module may further comprise a reflective plate disposed below the light guide panel, the reflective plate reflecting light escaping from the light guide panel and traveling away from the low refractive index layer back towards the light guide panel and the low refractive index layer.

A liquid crystal display module of another aspect comprises a light source to generate light, a light guide panel through which the light from the light source propagates, means for reflecting light in the light guide panel that impinges on a surface of the light guide panel at least a critical angle and transmitting light in the light guide panel that impinges on the surface at less than the critical angle, the critical angle measured from a plane perpendicular to that formed by the surface, and a transmissive liquid crystal display panel disposed on the reflecting means.

The critical angle may be defined by: $90°-\sin^{-1}(1/\text{a first refractive index of the light guide panel})>\sin^{-1}(\text{a refractive index of the reflecting means/the refractive index of the light guide panel})$.

The reflecting means may be disposed directly on the light guide panel.

The liquid crystal display module may further comprise optical sheets disposed on the reflecting means and a polarizer disposed on the optical sheets to polarize light from the optical sheets.

The transmissive liquid crystal display panel may include a lower substrate disposed on the polarizer and an upper substrate facing the lower substrate with liquid crystal therebetween to selectively transmit the light through the liquid crystal by driving the liquid crystal or an upper substrate facing the polarizer with liquid crystal therebetween to selectively transmit the light through the liquid crystal by driving the liquid crystal and no substrate disposed between the liquid crystal and the light guide panel.

The liquid crystal display module may further comprise a light source housing reflecting the light generated by the light source towards the light guide plate and a condenser disposed between the light source and the light guide panel, the condenser condensing the light generated by the light source and the light reflected by the light source housing into a smaller range of angles emitted into the light guide panel.

The critical angle may be defined by: $90°-\text{condensed degree by the condenser}>\sin^{-1}(\text{a refractive index of the reflecting means/a refractive index of the light guide panel})$.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

With reference to FIGS. 4 to 7, embodiments of the present invention will be explained as follows.

Figure 1:
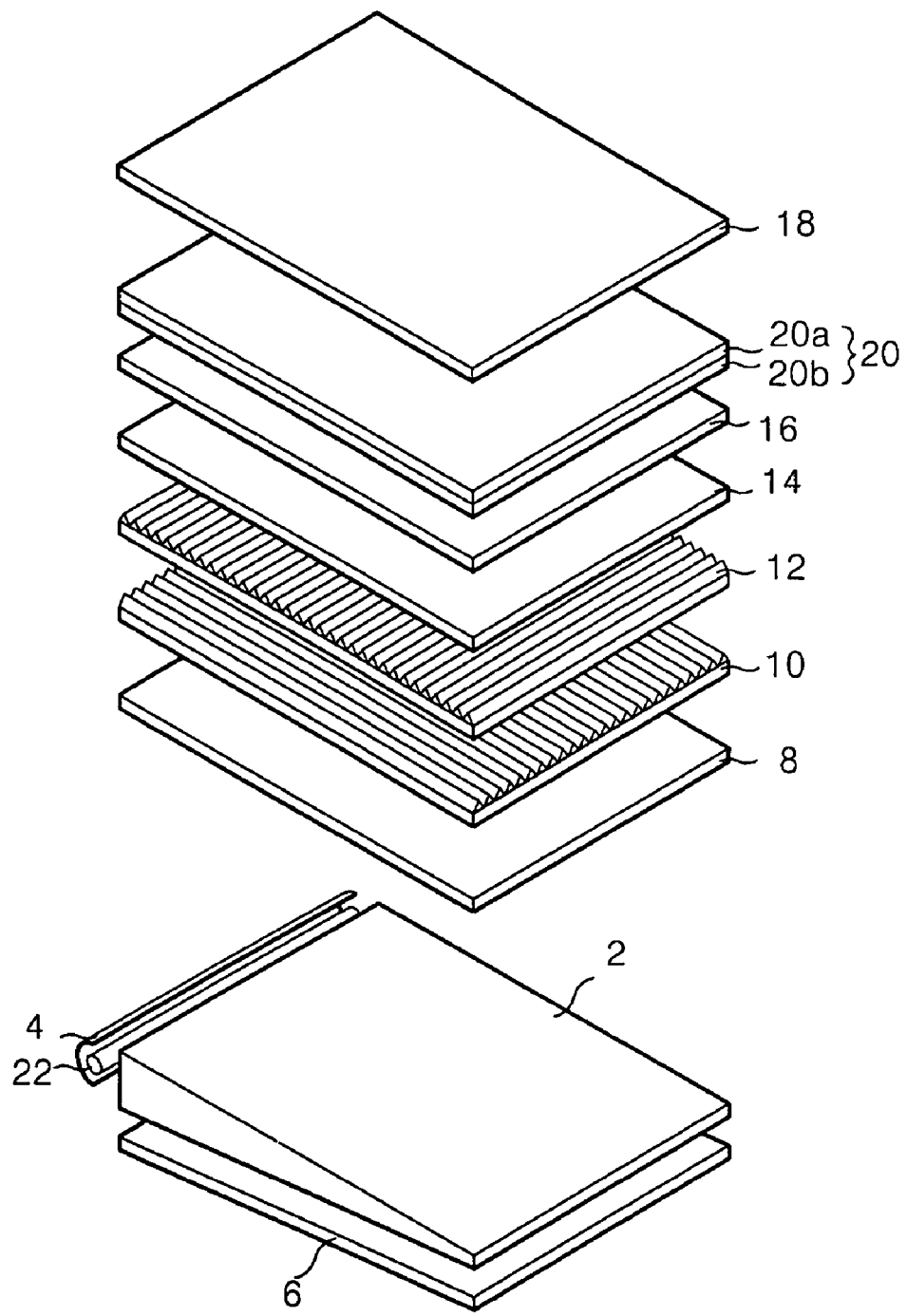
FIG. 1 is a perspective view representing a known liquid crystal display module.
Figure 2:
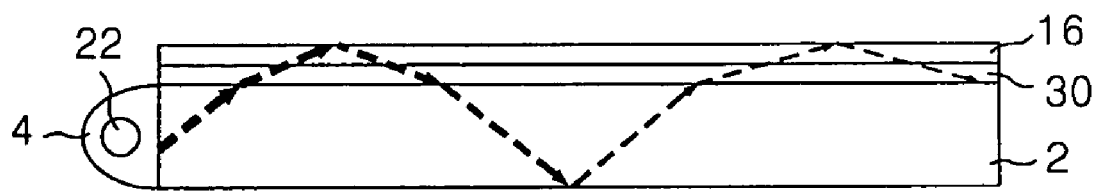
FIG. 2 is a sectional view representing a known liquid crystal display module which is integrated with a light guide panel, optical sheets and a polarizer.
Figure 3:
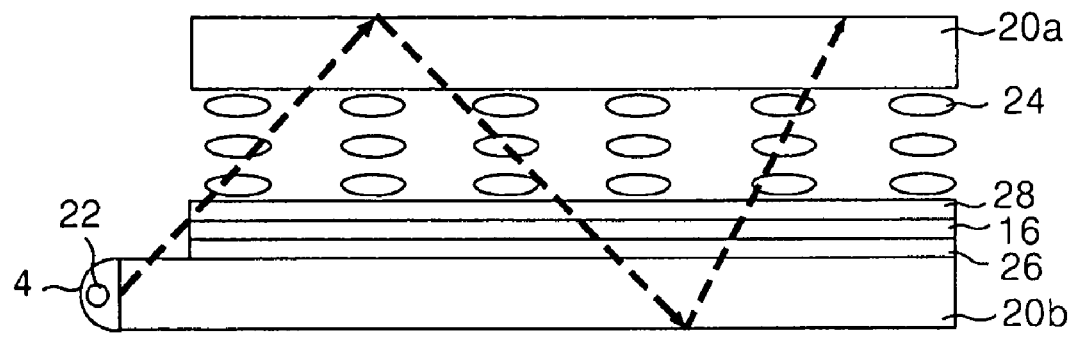
FIG. 3 is sectional view representing a known liquid crystal display module without a light guide panel.
Figure 4:
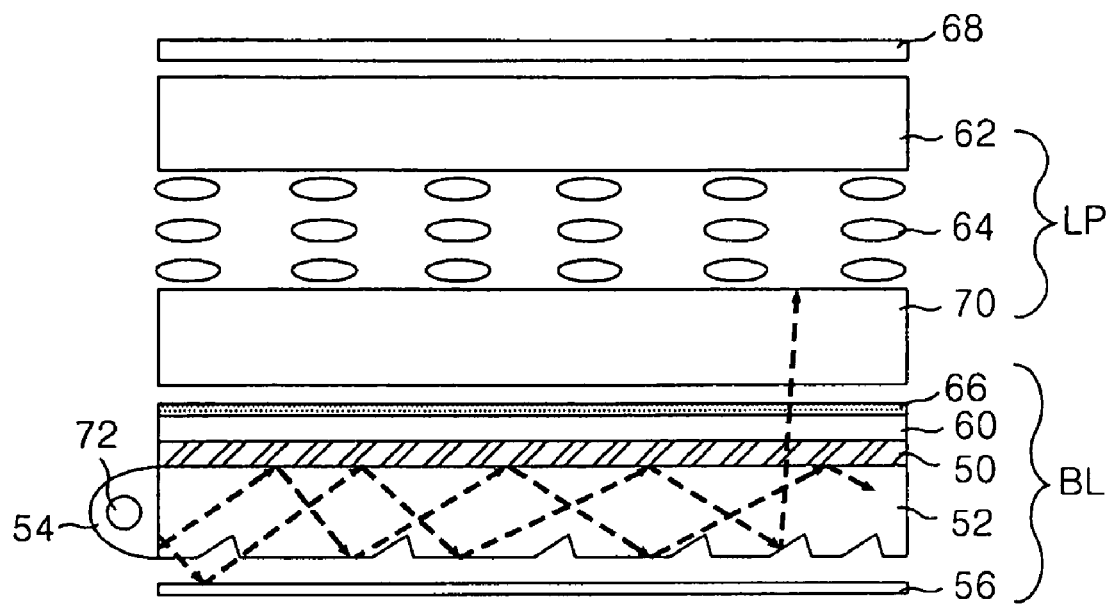
FIG. 4 is a sectional view representing a liquid crystal display module according to a first embodiment of the present invention.

FIG. 4 is a sectional view representing a liquid crystal display module according to a first embodiment of the present invention.

Referring to FIG. 4, a liquid crystal display module according to a first embodiment of the present invention includes a backlight unit BL and a liquid crystal display panel LP located on the backlight unit BL.

The backlight unit BL includes a lamp 72 generating light, a lamp housing 54 equipped with the lamp 72, a light guide panel 52 to convert the light being incident from the lamp 72 into a surface light, a low refractive index layer 50 disposed on an upper surface of the light guide panel 52, optical sheets 60 disposed on the low refractive index layer 50 in order to increase the efficiency of the light incident on the liquid crystal display panel LP, and a reflective plate 56 disposed on a lower surface of the light guide panel 52 to reflect the light emitted to the lower surface of the light guide panel 2 to a display panel.

The low refractive index layer 50, the optical sheets 60, a lower polarizer 66 and the light guide panel 52 of the backlight unit BL are integrated by use of an adhesive (not shown)

The lamp 72 is mainly a cold cathode fluorescent lamp. And the light generated at the lamp 72 is incident to the light guide panel 52 through the incident surface that exists at the side of the light guide panel 52.

The lamp housing 54 is installed to have a reflective surface in the inner surface thereof to cover the lamp 72, so as to reflect the light from the lamp 72 to the incidence surface of the liquid guide panel 52.

The light guide panel 52 converts the incident light from the lamp 72 into surface light which essentially reaches the end of the light guide panel 52 located opposite the lamp 72. Such a light guide panel 52 has an incidence surface and outgoing surface perpendicular to each other. A reflective plate 56 is installed to face the lower surface of the light guide panel 52. The light guide panel 52 is made of a material having a relatively high refractive index, which is a first refractive index n1. On the other hand, the light guide panel 52 has a sloped lower surface and a horizontal upper surface to increase the efficiency of light emitted. At least one of groove and protrusion patterns are formed on at least one of the lower surface and the upper surface.

The low refractive index layer 50 is disposed on the light guide panel 52. The low refractive index layer 50 is formed from a material that has a relatively lower refractive index than the light guide panel 52, i.e., a second refractive index n2 that is lower than the first refractive index n1. The low refractive index layer 50 causes total reflection of the light incident on the border area with the light guide panel 52 so as to propagate the light throughout the light guide panel 52.

The reflective plate 56 reflects the light incident to itself through the lower surface of the light guide panel 52 again toward the light guide panel 52, thereby reducing light loss. If the light from the lamp 72 is incident to the light guide panel 52, it is reflected at the specific tilt angle that the lower surface is sloped to evenly progress toward the upper surface. The light that progresses to the lower surface and side surface of the light guide panel 52 is reflected in the reflective plate 56 to progress toward the upper surface.

The optical sheets 60 include the diffusion sheet, first and second prism sheet and a protective film which are sequentially located on the low refractive index layer 50.

The diffusion sheet diffuses the light emitted through the light guide panel 52 and the low refractive index layer 50 to the entire area. The first and second prism sheets are composed of a plurality of prism stripes with peaks and valleys. The two prism sheets concentrate the outgoing light from the diffusion sheet in a direction perpendicular to the lower, planar surface to increase the light efficiency. For this, the two prism sheets are stacked in order to make the progress angle of the light emitted from the light guide panel 52, and the light is perpendicular to the liquid crystal display panel 52. The protective film is used to protect the surface of the second prism sheet, and diffuse the light to evenly distribute the light.

The lower polarizer 66 polarizes the light diffused by the protective film, and the upper polarizer 68 polarizes the light beam passing through the liquid crystal display panel LP.

In this way, the light generated at the integrated backlight unit BL is incident to the liquid crystal display panel LP through the lower polarizer 66.

The liquid crystal display panel LP includes an upper substrate 62 and the lower substrate 70, which are facing each other with liquid crystal 64 therebetween. A black matrix, a color filter and a common electrode (not shown) are formed on the upper substrate 62. And, a thin film transistor and a pixel electrode (not shown) are formed on the lower substrate 70. The liquid crystal display panel LP has its liquid crystal 42 driven by the voltage difference between a common electrode of the upper substrate 62 and the pixel electrode of the lower substrate 70 so as to selectively reflect the light from the integrated backlight unit BL, thereby displaying the picture.

On the other hand, in order to totally reflect the light incident to the low refractive index layer 50 of the backlight unit BL according to the first embodiment of the present invention, Formula 1 should be satisfied. In Formula 1, n1 represents a high refractive index and n2 does a low refractive index.

$$90°-\sin^{-1}(1/n1) > \sin^{-1}(n2/n1) \qquad \text{[Formula 1]}$$

For example, when the first refractive index (n1) of the light guide panel 52 is 1.7 and the second refractive index (n2) of the low refractive index layer 50 is 1.35, 53° is the critical angle that satisfies the total reflection condition at the border area between the light guide panel 52 and the low refractive index layer 50. That is, if the light emitted from the light guide panel 52 and incident to the low refractive index layer 50 is located and its critical angle is in a range of 54~90° in relation to the horizontal direction, the entirety of the light is totally reflected at the border area between the light guide panel 52 and the low refractive layer 50.

In this way, if the liquid crystal display module according to the first embodiment of the present invention satisfies Formula 1, the part of the incident light from the light guide panel is totally reflected at the low refractive index layer. Accordingly, the liquid crystal display module according to the first embodiment of the present invention can reduce light loss even though it has optical sheets formed on top of the low refractive index layer. Further, since the support layer of the optical sheets is not present, the liquid crystal display module can be reduced in weight and thickness.

Figure 5:
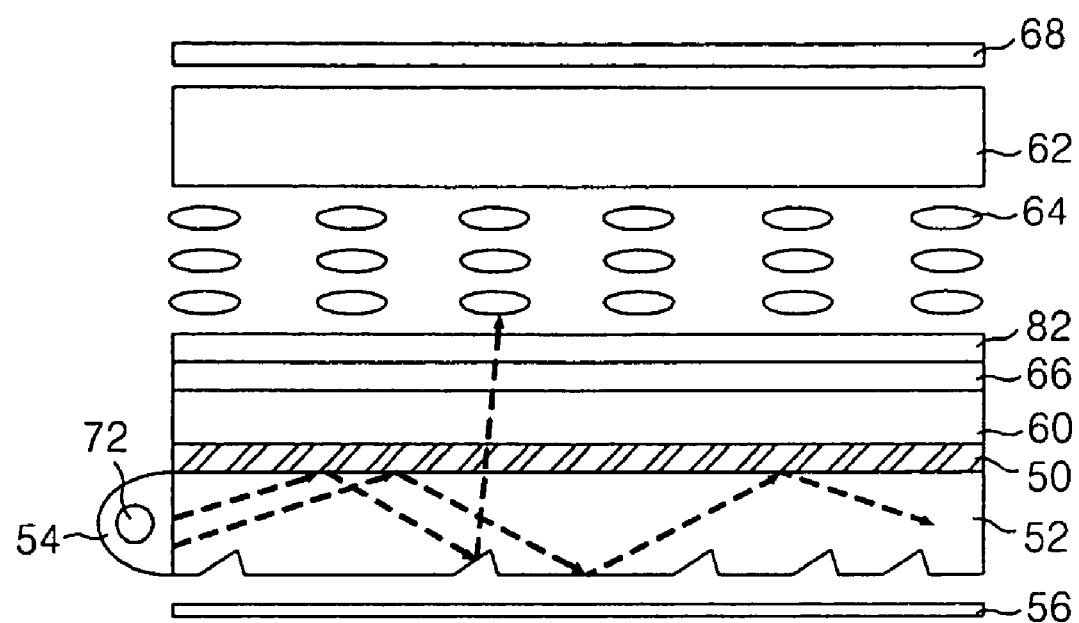
FIG. 5 is a sectional view representing a liquid crystal display module according to a second embodiment of the present invention.

FIG. 5 is a sectional view representing a liquid crystal display module according to a second embodiment of the present invention.

Referring to FIG. 5, the liquid crystal display module according to the second embodiment of the present invention, when compared with the liquid crystal display module shown in FIG. 4, has the lower substrate of the liquid crystal removed and has the same components except that a plurality of optical sheets, a polarizer and a plurality of electrodes are formed on the light guide panel.

The light guide panel 52 is made of a material which has a relatively high refractive index, i.e. the first refractive index n1. The low refractive index layer 50 is made of a material which has a lower refractive index (n2) than the light guide panel 52. The low refractive index layer 50 is disposed on the light guide panel 52. This low refractive index layer 50 causes the light to be totally reflected on the border area between the light guide panel 52 and the low refractive index layer 50 so as to propagate the light throughout the light guide panel 52.

In order to totally reflect the light incident to the low refractive index layer 50 of the front light unit FL according to the second embodiment of the present invention, Formula 2 should be satisfied.

$$90°-\sin^{-1}(1/n1) > \sin^{-1}(n2/n1) \qquad \text{[Formula 2]}$$

For example, when the first refractive index (n1) of the light guide panel 52 is 1.7 and the second refractive index (n2) of the low refractive index layer 50 is 1.35, 53° is the critical angle that satisfies the total reflection condition at the border area between the light guide panel 52 and the low refractive index layer 50. That is, if the incidence angle of the light emitted from the light guide panel 52 and incident to the low refractive index layer 50 is in a range of 54~90°, which is higher than the critical angle, in relation to the horizontal direction, the entirety of the light is totally reflected at the border area between the light guide panel 52 and the low refractive layer 50.

Optical sheets 60, a lower polarizer 66 and lower patterns 82 are formed on the low refractive index layer 50. The optical sheets 60 include a diffusion sheet, first and second prism sheets and a protective film. The lower polarizer 66 polarizes the light emitted from the optical sheets. The lower patterns 82 include gate lines, data lines, thin film transistors and pixel electrodes located on the lower polarizer 66. The light guide panel 52 integrated with the lower polarizer 66 where the lower patterns 82 are formed are formed to face the upper substrate 62 where a black matrix, a color filter and a common electrode are formed with liquid crystal 64 therebetween.

In this way, the liquid crystal display device according to the second embodiment of the present invention, if Formula 2 is satisfied, has the light incident to the light guide panel without light loss and emitted toward the upper substrate of the liquid crystal display panel throughout the light guide panel. Further, the liquid crystal display according to the second embodiment of the present invention has the lower patterns formed on the lower polarizer integrated with the light guide panel instead of the lower substrate where the lower patterns are normally formed. Accordingly, the lower substrate can be reduced in weight or thickness, thereby enabling it to be made light.

Figure 6:
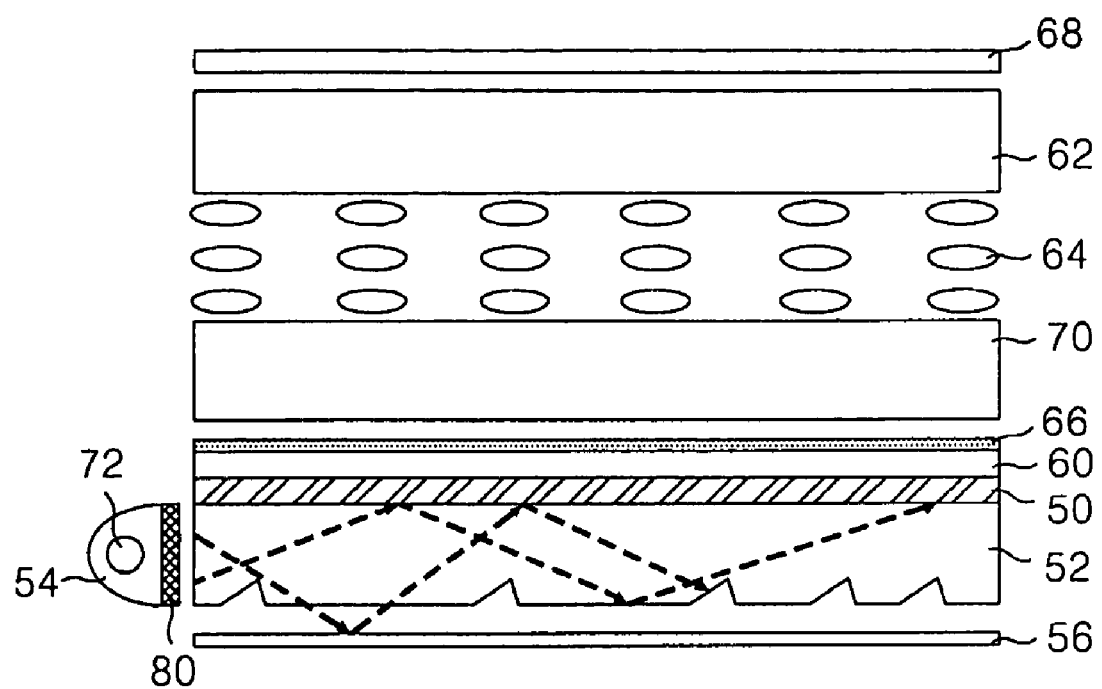
FIG. 6 is a sectional view representing a liquid crystal display module according to a third embodiment of the present invention.

FIG. 6 is a sectional view representing a liquid crystal display module according to a third embodiment of the present invention.

Referring to FIG. 6, the liquid crystal display module according to the third embodiment of the present invention, when compared with the liquid crystal display module shown in FIG. 4, has the same components except that a condensing device (condenser) is included in the incidence part of the light guide panel.

The condensing device 80 is formed of a plurality of prism patterns between the lamp 72 and the light guide panel 52 so as to reduce the light loss generated through an opening between the lamp 72 and the light guide panel 52. That is, the condensing device 80 condenses the light generated from the lamp 72 and the light reflected by the lamp housing 54. The condensed light is incident to the light guide panel 52 to be able to reduce the gap between the first refractive index (n1) of the light guide panel 52 and the second refractive index (n2) of the low refractive index layer 50. Such a condensing device 80 has high degree of strength, so it is not easily changed or broken and is made of acryl resin, which has a good transitivity. For example, the condensing device 80 is made of polymethyl methacrylate (PMMA). In case that the condensing device 80 is used, the light incident to the light guide panel 52 can be totally reflected when Formula 3 is satisfied.

$$90°-\text{condensed degree by condensing device} > \sin^{-1}(n2/n1) \qquad \text{[Formula 3]}$$

For example, when the first refractive index (n1) is 1.5 and the second refractive index (n2) is 1.35, the light incident to the light guide panel 52 located in a range of 64~90° in relation to the vertical direction is totally reflected at the border area between the light guide panel 52 and the low refractive layer 50. In this case, the condensing device 80 should condense light at about 26 degrees and below in a horizontal direction in relation to the angle of light incident to the light guide panel 52.

In this way, the liquid crystal display module according to the third embodiment of the present invention forms the low refractive index layer with low refractive index on the light guide panel with high refractive index. This causes the light incident on the light guide panel to be emitted toward the upper substrate and at the same time to be totally reflected and propagate to other areas of the light guide panel. Further, the optical sheets can be disposed on the light guide panel with the low refractive index layer therebetween, thus the thickness of the liquid crystal display module can be reduced. Further, the angle distribution of the light incident to the light guide panel is controlled by having the condensing device, thus it is possible to reduce the refractive index difference between the light guide panel of high refractive index and the low refractive index layer of low refractive index.

Figure 7:
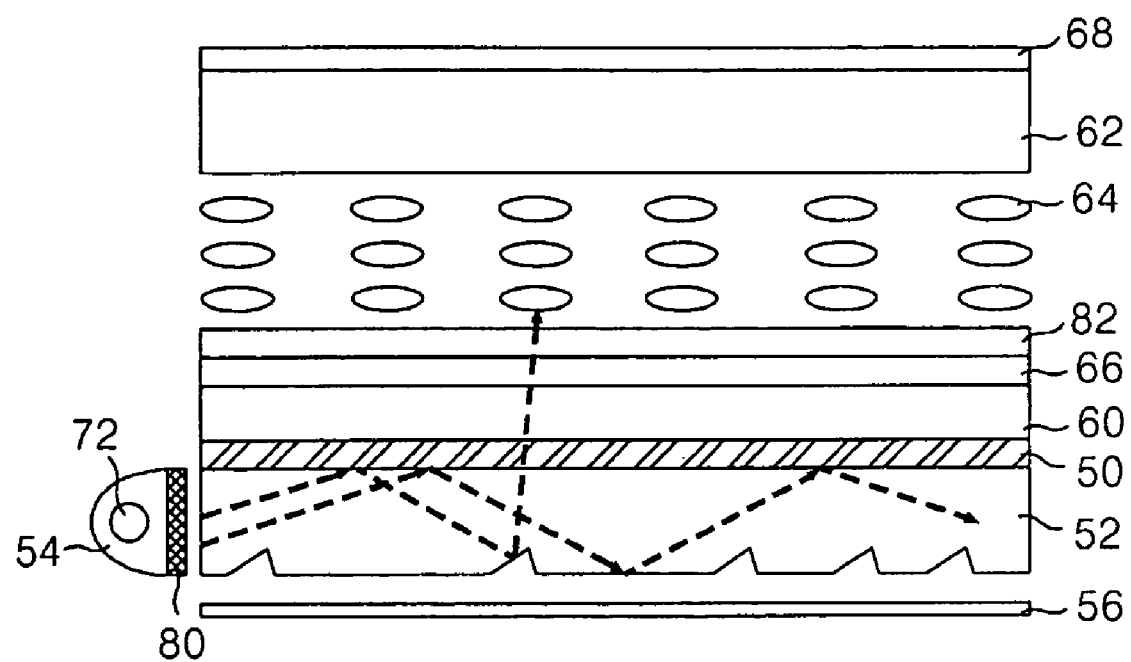
FIG. 7 is a sectional view representing a liquid crystal display module according to a fourth embodiment of the present invention.

FIG. 7 is a sectional view representing a liquid crystal display module according to a fourth embodiment of the present invention.

Referring to FIG. 7, the liquid crystal display module according to the fourth embodiment of the present invention, when compared with the liquid crystal display module shown in FIG. 6, has the same components except that a plurality of optical sheets, a polarizer and a plurality of electrodes are formed on the light guide panel not in the lower substrate.

In order to make the light totally reflected on the border area between the low refractive index layer 50 of the second refractive index (n2) and the light guide panel 52 of the first refractive index (n1) of the liquid crystal display module according to the fourth embodiment of the present invention, Formula 4 should be satisfied.

$$90°-\text{condensed degree by condensing device} > \sin^{-1}(n2/n1) \qquad \text{[Formula 4]}$$

For example, when the first refractive index (n1) is 1.5 and the second refractive index (n2) is 1.35, the light incident to the light guide panel 52 in a range of 64~90° in relation to the vertical direction is totally reflected at the border area between the light guide panel 52 and the low refractive layer 50. In this case, the condensing device 52 should condense light at about 26 degrees and below in a horizontal direction in relation to the angle of light incident to the light guide panel 52.

Optical sheets 60, a lower polarizer 66 and lower patterns 82 are formed on the low refractive index layer 50. The optical sheets 60 include a diffusion sheet, first and second prism sheets and a protective film. The lower polarizer 66 polarizes the light going out from the optical sheets 60. The lower patterns 82 include gate lines, data lines, thin film transistors and pixel electrodes located on the lower polarizer 66. The light guide panel 52 integrated with the lower polarizer 66 where the lower patterns 82 are formed are formed to face the upper substrate 62 where a black matrix, a color filter and a common electrode are formed with liquid crystal 64 therebetween.

In this way, the liquid crystal display module according to the forth embodiment of the present invention forms the low refractive index layer with low refractive index on the light guide panel with high refractive index, thereby causing the light incident on the light guide panel to be emitted toward the upper substrate and at the same time to be totally reflected and propagate to other areas of the light guide panel. Further, the liquid crystal display device according to the fourth embodiment of the present invention forms the lower patterns in the lower polarizer which is integrated with the light guide panel instead of the lower substrate where the lower patterns are formed. Accordingly, the lower substrate can be reduced in weight and thickness, thereby making it light. In addition, the liquid crystal display module according to the fourth embodiment of the present invention includes the condensing device to control the angle distribution of the light incident to the light guide panel, thereby reducing the refractive index difference between the light guide panel of high refractive index and the low refractive index layer of low refractive index.

As described above, the liquid crystal display module according to the present invention forms the low refractive index layer with low refractive index on the light guide panel with high refractive index, thereby causing the light incident to the light guide panel to be emitted toward the upper substrate and at the same time to be reflected and propagate to other areas of the light guide panel without light loss. Further, the liquid crystal display module according to the present invention can remove at least any one of the support layer of the optical sheets or the lower substrate of the liquid crystal display panel so as to reduce it in weight and thickness, thereby enabling the structure to be made light. Further, the liquid crystal display module according to the present invention has the condensing device to control the angle distribution of the light incident to the light guide panel, thereby making it possible to reduce the refractive index difference between the light guide panel of high refractive index and the low refractive index layer of low refractive index.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display module, comprising:
    a light source to generate light;
    a light guide panel through which the light from the light source propagates, the light guide panel having a first refractive index;
    a low refractive index layer disposed on the light guide panel, the low refractive index layer having a second refractive index which is lower than the first refractive index;
    a transmissive liquid crystal display panel disposed on an upper portion of the lower refractive layer;
    optical sheets disposed on the low refractive index layer; and
    a polarizer disposed on the optical sheets to polarize light from the optical sheets, wherein the transmissive liquid crystal display panel includes an upper substrate facing the lower reflective index layer with liquid crystal therebetween, and no substrate is disposed between the liquid crystal and the light guide panel.

2. The liquid crystal display module according to claim 1, wherein the light in the light guide panel is totally reflected at a border between the light guide panel and the low refractive index layer when the light in the light guide panel impinges on the border at an angle of: $90°-\sin^{-1}(1/\text{the first refractive index})>\sin^{-1}(\text{the second refractive index}/\text{the first refractive index})$.

3. The liquid crystal display module according to claim 1, wherein the first refractive index is 1.7 and the second refractive index is 1.35.

4. The liquid crystal display module according to claim 1, further comprising:
    condenser disposed between the light source and the light guide panel.

5. The liquid crystal display module according to claim 4, wherein the light in the light guide panel is totally reflected at a border between the light guide panel and the low refractive index layer when the light in the light guide panel impinges on the border at an angle of: $90°-\text{condensed degree by the condenser}>\sin^{-1}(\text{the second refractive index}/\text{the first refractive index})$.

6. The liquid crystal display module according to claim 4, wherein the first refractive index is 1.5 and the second refractive index is 1.35.

7. The liquid crystal display module according to claim 4, wherein the upper substrate faces the polarizer with liquid crystal therebetween to selectively transmit the light through the liquid crystal by driving the liquid crystal.

8. The liquid crystal display module according to claim 1, wherein the low refractive index layer is disposed on a first surface of the light guide panel, and a second surface of the light guide panel that opposes the first surface has a plurality of grooves to reflect light impinging on the grooves towards the transmissive liquid crystal display panel.

9. The liquid crystal display module according to claim 1, further comprising a reflective plate disposed below the light guide panel, the reflective plate reflecting light escaping from the light guide panel and traveling away from the low refractive index layer back towards the light guide panel and the low refractive index layer.

10. The liquid crystal display module according to claim 9, wherein the upper substrate faces the polarizer with liquid crystal therebetween to selectively transmit the light through the liquid crystal by driving the liquid crystal.

* * * * *